United States Patent
Flisberg et al.

(10) Patent No.: US 9,093,921 B2
(45) Date of Patent: Jul. 28, 2015

(54) INSULATION IN A POWER TRANSMISSION SYSTEM

(75) Inventors: Gunnar Flisberg, Ludvika (SE); Dong Wu, Ludvika (SE); Per-Olof Hedblad, Ludvika (SE)

(73) Assignee: ABB TECHNOLOGY AG, Zurich (CH)

( * ) Notice: Subject to any disclaimer, the term of this patent is extended or adjusted under 35 U.S.C. 154(b) by 423 days.

(21) Appl. No.: 13/521,185

(22) PCT Filed: Feb. 2, 2010

(86) PCT No.: PCT/EP2010/051233
§ 371 (c)(1),
(2), (4) Date: Sep. 27, 2012

(87) PCT Pub. No.: WO2011/095204
PCT Pub. Date: Aug. 11, 2011

(65) Prior Publication Data
US 2013/0021830 A1    Jan. 24, 2013

(51) Int. Cl.
*H02M 3/00* (2006.01)
*H02M 7/521* (2006.01)

(52) U.S. Cl.
CPC ..................... *H02M 7/521* (2013.01)

(58) Field of Classification Search
CPC .............. H02M 7/537; H02M 7/5381; H02M 7/53806; H02M 7/757; H02M 5/45; H02M 7/003
USPC .......... 363/37, 51, 65, 125, 144–146
See application file for complete search history.

(56) References Cited

U.S. PATENT DOCUMENTS 3,684,943 A * 8/1972 Demarest ........................ 363/123
5,371,651 A   12/1994 Asplund et al.

FOREIGN PATENT DOCUMENTS

EP    0 754 367 B1    9/1998

OTHER PUBLICATIONS

High Voltage Direct Current Transmission 1998, The Institution of Electrcal Engineers, London, United Kingdom, XP002604497 ISBN: 0 85296 941 4, pp. 283-284 ; 1988 Jos Arrillaga.*
Arrillaga, "High Voltage Direct Current Transmission", 11.3.3 Outdoor valves, The Institution of Electrical Engineers, 1998, pp. 283-284, XP 002604497, London, UK.
Astrom et al., "Power Transmission With HVDC at Voltages Above 600 KV", Power Engineering Society Inaugural Conference and Exposition in Africa, IEEE, Jul. 11-15, 2005, pp. 44-50, XP 031259834.
Wen et al., "Researches on the Noise Models of Valves DC PLC Filters in UHVDC Transmission Project", Power System Technology and IEEE Power India Conference, Oct. 12, 2008, pp. 1-5, XP 031404544.

* cited by examiner

*Primary Examiner* — Adolf Berhane
*Assistant Examiner* — Yemane Mehari
(74) *Attorney, Agent, or Firm* — Birch, Stewart, Kolasch & Birch, LLP

(57) ABSTRACT

A substation has a converter comprising a first set (S1) of series connected converter valve elements provided between a first (V1) and a second (V2) potential, where the absolute value of the second potential is higher than the absolute value of the first potential, and a second set (S2) of converter valve elements, comprising at least one converter valve element, provided between the second and a third potential (V3), where the absolute value of the third potential is higher than the absolute value of the second potential and all converter valve elements of the second set are placed inside one or more casings (28) placed on elongated post-like insulation (24), where the potential of the end of the post-like insulation on which the casings are placed is in a range between the second and the third potential, while the other end of the post like insulation is at ground potential.

10 Claims, 3 Drawing Sheets

INSULATION IN A POWER TRANSMISSION SYSTEM

FIELD OF INVENTION

The present invention generally relates to power transmission systems. More particularly the present invention relates to a substation of a power transmission system.

BACKGROUND

In power transmission systems and then especially in High Voltage Direct Current (HVDC) power transmission systems, the voltages used in power transmissions are getting higher and higher. Today 800 kV is used in many situations. However, nowadays even higher levels are contemplated, such as 1000 kV or even 1200 kV.

The use of such high levels lead to various types of problems. Some such problems are discussed by Davidson and de Preville in "The Future of High Power Electronics in Transmission and Distribution Power Systems", 13th European Conference on Power Electronics and Applications, EPE 2009, 8-10 Sep. 2009 Page:1-14.

One specific type of problem is the insulation. This has for instance been studied by U Åström, B Westman, V Lescale and G Asplund in "Power transmission with HVDC at voltages above 600 kV", Inaugural IEEE PES 2005 Conference and Expositions in Africa, Durban, South Africa, 11-15 Jul. 2005, page 44-50.

In such systems it is also known to provide the valves of converter stations as a number of interconnected outdoor converter valve elements. Such elements are for instance described in EP 0754367 and U.S. Pat. No. 5,371,651.

As mentioned above one problem that arises when designing a system that is to operate at very high voltages, is the insulation. Extraordinary measures may need to be made in order to ensure insulation that can handle the required voltage levels, which makes the equipment bulkier, associated with extensive development costs and will lead to more complicated designs of bushings and general insulation.

There is therefore a need for improving the way insulation is provided for power transmission system equipment that can be used at very high voltages, such as voltages at or above 1000 kV.

SUMMARY OF THE INVENTION

One object of the present invention is to provide a substation, where improved insulation is provided that can be used at very high voltages.

This object is according to the present invention obtained through a substation of a power transmission system having a converter for conversion between AC and DC or vice versa, where the converter comprises:

a first set of series connected converter valve elements provided together in a phase leg between a first and a second potential, where the absolute value of the second potential is higher than the absolute value of the first potential, and a second set of converter valve elements provided in the same phase leg between the second and a third potential, where the absolute value of the third potential is higher than the absolute value of the second potential. The second set furthermore comprises at least one converter valve element and all converter valve elements of the second set are provided inside one or more casings placed on elongated post-like insulation, where the potential of the end of the post-like insulation on which the casings are placed is in a range between the second potential and the third potential, while the other end of the post-like insulation has ground potential.

The present invention has a number of advantages. It allows existing equipment with insulation adapted for known potentials to be used for new and higher potentials. This reduces development costs. If the operational potentials are high, the amount of insulation and the complexity of such equipment like bushings can also be reduced.

BRIEF DESCRIPTION OF THE DRAWINGS

The present invention will in the following be described with reference being made to the accompanying drawings, where FIG. 1 schematically shows a power transmission system including a first and a second substation, each including at least one transformer and a converter with converter valve elements, FIG. 2 schematically shows a first set of transformer and a first and a second set of converter valve elements in a first embodiment of the invention, FIG. 3 schematically shows how the converter valve elements of FIG. 2 have been placed and insulated in the first embodiment of the invention, FIG. 4 schematically shows a first set of transformers and a first and a second set of converter valve elements in a second embodiment of the invention, and FIG. 5 schematically shows how one transformer in the first set of transformers and a pair of converter valve elements in the second set of converter valve elements have been placed and insulated in the second embodiment of the invention.

DETAILED DESCRIPTION OF THE INVENTION

A substation according to the invention will in the following be described in relation to power transmission systems and then more particularly in relation to a High Voltage Direct Current (HVDC) power transmission system. However, it should be realized that the invention is not limited to this type of system, but can be applied in any type of system employing converter valves, for instance also to AC systems such as Flexible Alternating Current Transmission Systems (FACTS).

Figure 1:
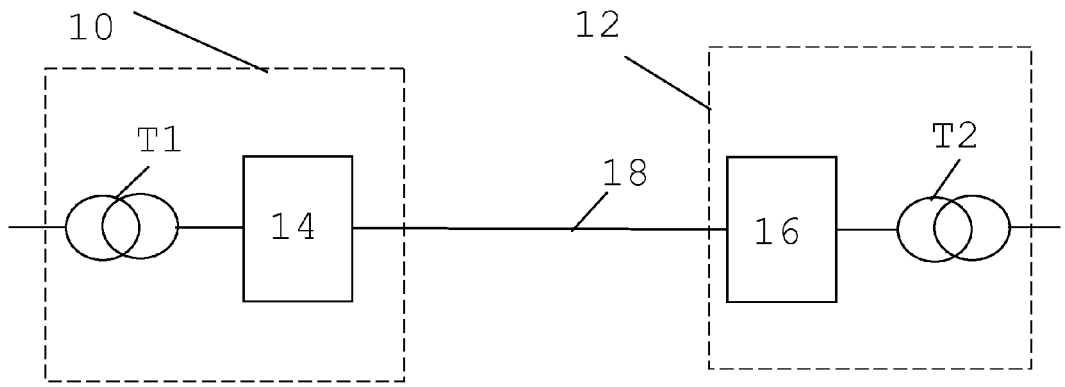

In FIG. 1 there is schematically shown an HVDC system for connection between two Alternating Current (AC) power transmission systems. For this reason the HVDC system includes a first and a second substation 10 and 12, where the first substation 10 includes a first set of transformers, exemplified by one transformer T1 and a first converter 14 for conversion between AC and DC, which converter may be a rectifier. The first set of transformers T1 connects the first converter 14 to the first AC power transmission system (not shown). The first converter 14 is connected to a second converter 16 of a second substation 12 via a DC power line 18. The second converter 16 also converts between AC and DC and may be an inverter. The second substation 12 also includes a second set of transformers, exemplified by one transformer T2, which set connects the second converter 16 to the second AC power transmission system (not shown). A set of transformers may include only one transformer, but may also include several transformers. The use of several transformers in a set makes it easier to obtain high DC voltages.

The HVDC system in FIG. 1 is a monopole system. The invention will in the following be described in relation to such a system. It should however be realized that the invention may also be provided in a bipole system. The HVDC system can furthermore be more complex and include several more power lines and substations.

Both the converters 14 and 16 may be any type of converters, such as line-commutated Current Source Converters (CSC) or forced commutated Voltage Source Converters (VSC). In this description of the invention they are CSCs. It should however be realized that the type of converter used is not central to the invention as long as it is a converter converting between AC and DC that includes converter valve elements.

The invention will now be described in relation to one of the substations and here the first substation. It should however be realized that the principles of the present invention can also be applied on other substations, such as the second substation.

Figure 2:
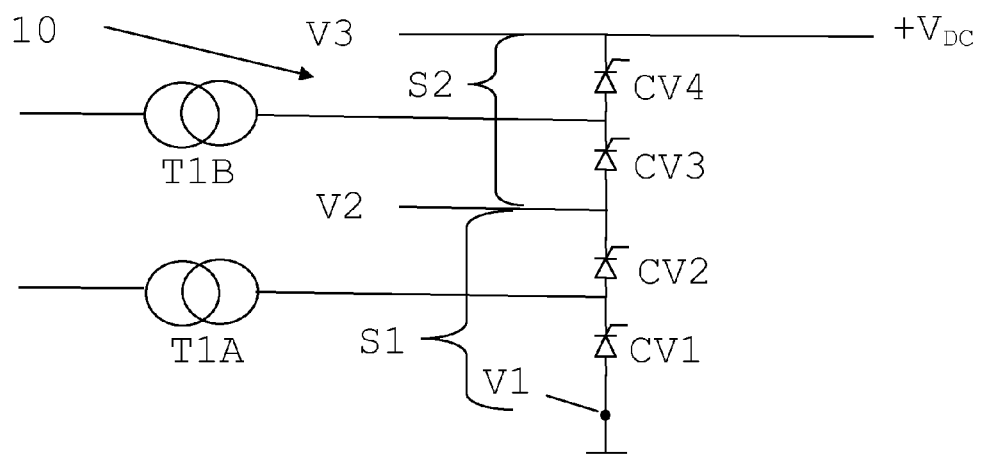

FIG. 2 shows an electrical circuit diagram of a part of the first substation 10 that provides basic information that is helpful in the understanding of the first embodiment of the present invention.

In FIG. 2 there is a first and a second set S1 and S2 of converter valve elements. These converter valve elements are made up of semiconductor elements and in the embodiments shown here of thyristors. It should however be realized that as an alternative it is possible that the converter valve elements are provided as switches of turn-off type, perhaps together with anti-parallel diodes. These switches can for instance be Insulated Gate Bipolar Transistors (IGBT), Integrated Gate-Commutated Thyristors (IGCT) or Gate Turn-Off Thyristors (GTO). A converter valve element may furthermore include more than one such series-connected semiconductor element.

In FIG. 2 these converter valve elements are connected in series in the converter for forming a phase leg connected between ground and an output DC terminal $+V_{DC}$. In FIG. 2 there is only one such phase leg shown in order to provide a clearer understanding of the present invention. It should be realized that there are normally more such phase legs in parallel with each other, like two. In case a connected AC system is a three-phase system, which is the normal case, there are three phase legs. FIG. 2 also discloses the first set of transformers, which includes a first transformer T1A and a second transformer T1B. The first and second transformers T1A and T1B both have primary windings connected to the first AC power transmission system and secondary windings connected to the phase legs. In case the AC system is a three phase system there are thus three primary windings and three secondary windings.

The system can as mentioned earlier also be a bipole system in which case the number of converter valve elements could be doubled.

As mentioned earlier, the converter valve elements are connected in series with each other. In this exemplifying figure there is furthermore a first converter valve element CV1 at a first end connected to ground and at a second opposite end connected to a first end of a second converter valve element CV2. The second converter valve element CV2 has a second end connected to a first end of a third converter valve element CV3, the second end of which is connected to a first end of a fourth converter valve element CV4. The second end of the fourth converter valve element CV4 is connected the output DC terminal $+V_{DC}$. As the first transformer T1A is connected to the junction between the first and the second converter valve elements CV1 and CV2, while the second transformer T1B is connected to the junction between the third and the fourth converter valve elements CV3 and CV4.

The first and second converter valve elements CV1 and CV2 in this first embodiment form a first set S1 of converter valve elements, while the third and the fourth converter valve elements CV3 and CV4 form a second set S2 of converter valve elements. In this embodiment there are thus two converter valve elements in the second set. It should however be realized that it is possible with more or fewer converter valve elements in this second set. The first set of converter valve elements is at one end, at the first end of the first converter valve element CV1, provided at a first electric potential and at another opposite end, the end where the first set is connected to the second set, i.e. at the junction between the first and second sets of converter valve elements, provided at another, higher potential, V2. The junction between the second set S2 of converter valve elements and the output DC voltage terminal is here provided at a third even higher potential V3.

The first set S1 of series connected converter valve elements are thus provided together in a phase leg between the first V1 and the second V2 potential, while the second set S2 of converter valve elements is provided in the same phase leg between the second and the third potential V3. Here also the absolute value of the third potential is higher than the absolute value of the second potential, which in turn is higher than the absolute value of the first potential.

As can be seen in FIG. 2 the secondary winding of the first transformer T1A of the first set in this first embodiment is connected to the junction between the first and the second converter valves CV1 and CV2 of the phase leg, while the second transformer T1B of the first set is connected to the junction between the third and the fourth converter valve elements CV3 and CV4. In case of a three-phase AC power transmission system, each secondary winding would be connected to a corresponding phase leg in this way.

In this first embodiment of the invention V1 is zero, V2 is 750 kV, while V3 is 1000 kV.

At such a high voltage as that at which the third potential is provided, there do today not exist bushings or insulating devices adapted to these high potential levels. However, there do exist modular converter valve elements. The invention is directed towards using such modular converter valve elements together with standard substation equipment in order to avoid having to design new insulation entities adapted for these new higher voltage levels. Such a converter valve element is for instance described in EP 0754367, which is herein incorporated by reference.

Figure 3:
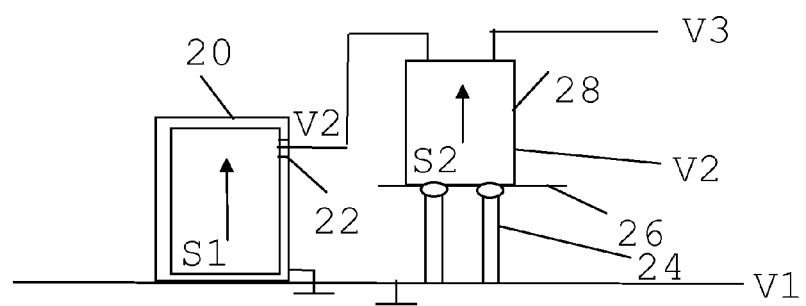

FIG. 3 schematically shows how this is achieved according to the first embodiment of the invention.

In FIG. 3 the first set of converter valves S1 are provided in a valve hall 20, i.e. in a building, the walls of which include shielding material. The shielding of this hall is in this embodiment connected to ground. The first set of converter valve elements are thereby placed in a common enclosure, namely the valve hall 20, which is provided at the first potential V1. In the wall of the hall there is furthermore a bushing 22, through which a conductor leads to the second set S2 of converter valve elements. This second set of converter valve elements is provided in one or more converter valve element casings 28 and here in one casing. These elements in the second set are typically provided according to the principles described in EP 0754367, which is herein incorporated by reference. Here the casing 28 is furthermore placed on a surface 26 resting on a number of elongated post-like support insulators or insulating posts 24, which posts may be of porcelain or any other suitable insulating material. The posts 24 stand on the ground, and thus they are provided at the first potential V1. The casing 28 is however provided at a potential that is in a range between the second and the third potential. In this embodiment the casing is provided at the second potential V2. This may be done through the input to the box being connected to the casing 28. The output from the box is finally provided at the potential V3, which is to be connected to the DC power line (not shown). In this way the second set S2 of converter valve elements are thus provided above ground and shielded by a shielded box 28 at the second potential V2, while the first set S1 of converter valve elements in the valve hall 20 are shielded by a shield at the first potential V1. The converter valve elements in the first set in the valve hall 20 deliver power at the second potential, which in this embodiment is 750 kV.

All converter valve elements of the second set are thus placed inside one or more casings 28 placed on elongated post-like insulation 24, where the potential of the end of the post-like insulation on which the casings are placed is in a range between the second potential and the third potential, while the other end of the post like insulation is at ground potential.

There already exist bushings leaving the valve hall that are dimensioned to withstand potentials between the first and the second potential as well as even higher potentials such as at 800 kV. The bushing 22 leaving the valve hall is thus dimensioned to withstand the difference between the second and first potential V2–V1. This means that there exist bushings designed to handle the second potential V2. Through adding the second set of converter valve elements provided in one or more shielded outdoor boxes, with the shielding provided at the second potential, it is possible to supply power at the third higher voltage level V3 without having to develop new bushings and conductor insulation that are dimensioned to withstand the difference between the third and the first potential V3–V1, but it is possible to use insulation designed to withstand a much smaller potential namely a potential that is the difference between the third and the second potential V3–V2. The shielded box may therefore be provided with a connection terminal for connection to the DC power line, which connection terminal goes through a bushing designed to withstand voltages having a potential that is the difference between the third and second potentials. The above described shielded converter valve boxes have precisely these properties.

This means that with the above described levels, the insulation in relation to the first set of converter valve elements in the valve hall is designed for 750 kV, while the insulation in relation to the second set of converter valve elements in the shielded box need only be designed for 250 kV. There is no need to develop new insulations for the various connections needed at the higher potential of V3–V1, which in the present example is 1000 kV.

It can here be mentioned that is possible to use more shielded boxes for the second set of converter valve elements, where it is also possible with the input to each such box being connected to its own shielding. It is also possible that only the first or a few such boxes have such a connection. It is furthermore possible that the valve hall is not shielded or shielded at another potential than ground, for instance (V2–V1)/2.

Figure 4:
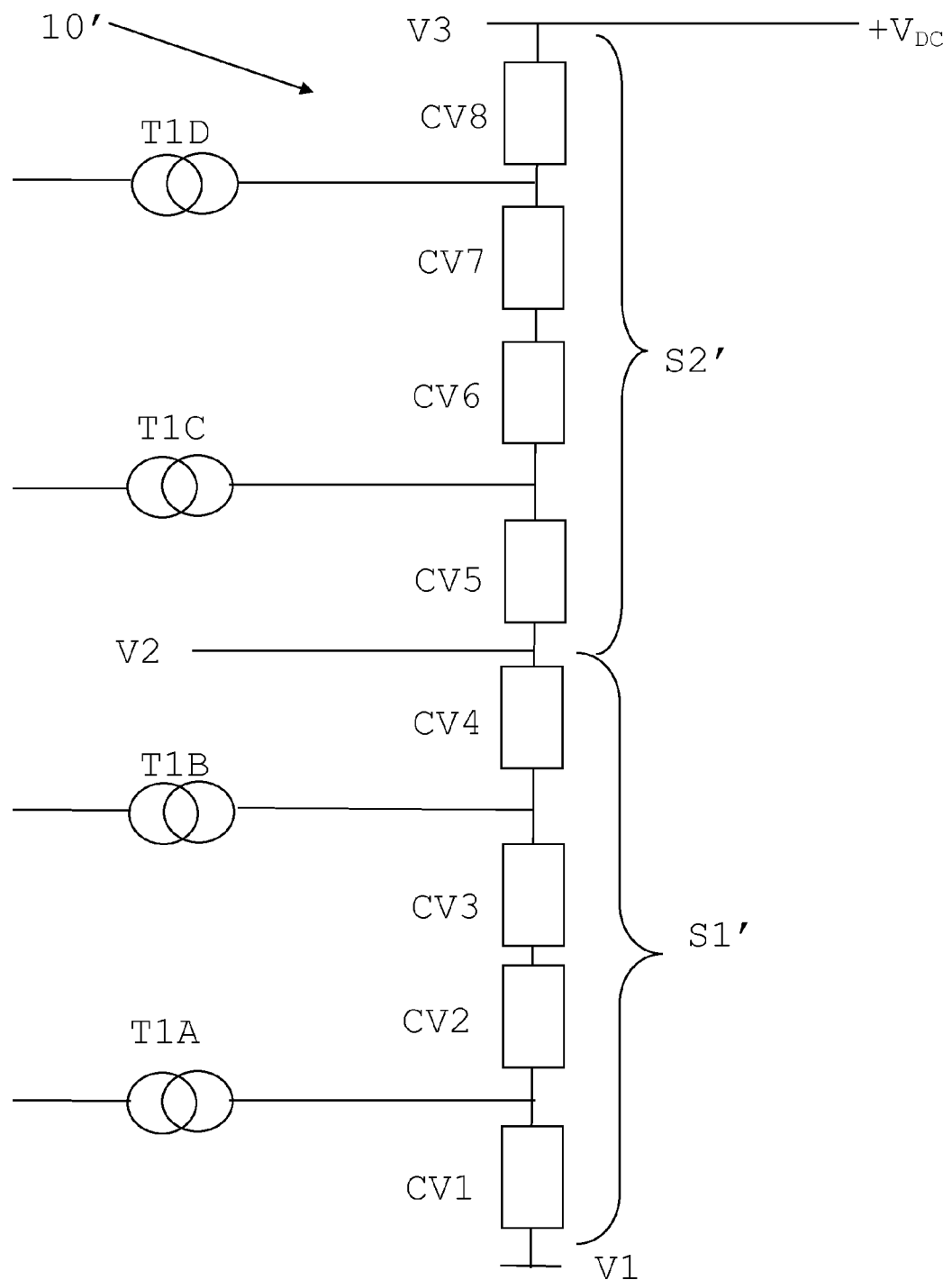

Now a second embodiment of the present invention will be described in relation to FIG. 4, which schematically shows an alternative way of interconnecting the converter valve elements with a first set of transformers. In FIG. 4 the converter valve element are furthermore shown as boxes instead of as components.

In this embodiment the substation 10' includes a first and a second set S1' and S2' of converter valve elements connected in series with each other and connected between the first and third potential V3 and V1. The first set S1 is in this embodiment made up of a first, second, third and fourth converter valve element CV1, CV2, CV3 and CV4, while the second set S2 is made up of a fifth, sixth, seventh and eighth converter valve element CV5, CV6, CV7 and CV8, with the first converter valve element CV1 connected to the first potential V1 and the eighth converter valve element CV8 connected to the third potential V3. The first set of transformers here includes four transformers, where a first transformer in this set T1A is connected to the junction between the first and the second converter valve element CV1 and CV2, a second transformer T1B in the set is connected to the junction between the third and fourth converter valve elements CV3 and CV4, a third transformer T1C in the set is connected to the junction between the fifth and sixth converter valve elements CV5 and CV6 and a fourth transformer T1D in the set is connected to the junction between the seventh and eighth converter valve elements CV7 and CV8. All these transformers are connected to the first AC power transmission system and are arranged to operate at an AC voltage level $V_{AC}$, which may be the 500 kV level. There is therefore at least one transformer, and in this second embodiment two transformers, connected between converter valve elements in the second set of converter valve elements. In the case of a three-phase AC system, the fourth transformer T1D in the set may have a wye connection to the phase legs, while the third transformer T1C in the set may have a delta connection to the phase legs.

Just as in the first embodiment, the first end of the first converter valve element CV1 is provided at the first potential V1, the junction between the first and the second sets of converter valves is provided at the second potential V2, while the output DC terminal has the third potential V3. However in this second embodiment the junction between the first and second sets of converter valve elements is provided at the junction between the fourth and the fifth converter valve elements CV4 and CV5, which is a lower relative position than in the first embodiment. This means that the second potential is half the third potential in this second embodiment and a higher potential than this in the first embodiment. In this second embodiment the potential between the sixth and seventh converter valve elements and CV6 and CV7 is furthermore provided at a potential that is equal to the sum of the second and third voltages divided by two, i.e. to (V2+V3)/2.

In this second embodiment the first set of converter valve elements may be provided inside a valve hall as in the first embodiment of the invention. This valve hall may be provided with a shield connected to a potential like the first potential. It may also be connected to another potential, like for instance a potential of (V2+V1)/2 or lack shielding. They may also be provided as converter valve elements in shielded outdoor boxes, either separately or jointly as described in EP 0754367. In this second embodiment the converter valve elements of the second set, i.e. the fourth, fifth, sixth, seventh and eighth converter valve elements CV5, CV6, CV7 and CV8 are provided in shielded boxes, with these boxes provided at a certain potential according to EP 0754367. However also the transformers connected to these converter valves are provided at a potential.

How this is done will be described in more detail in relation FIG. 5.

Figure 5:
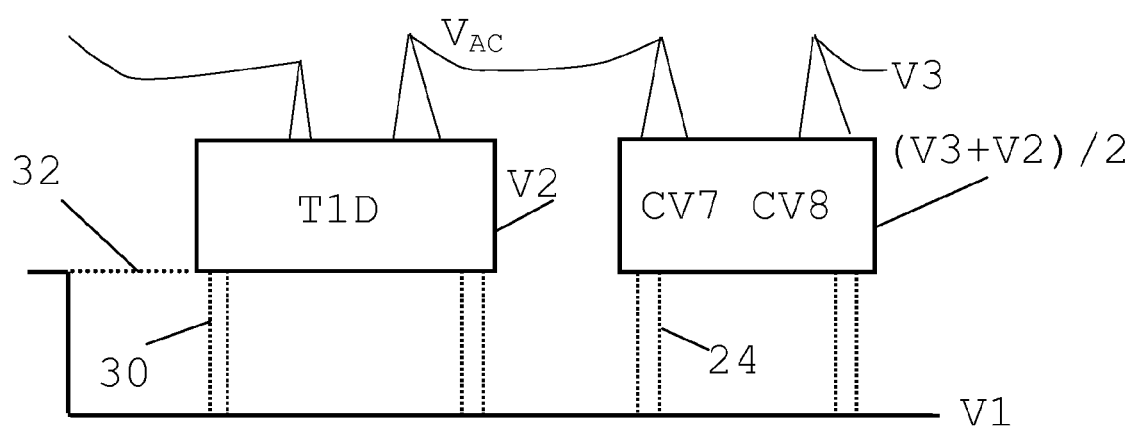

In FIG. 5 there is shown one transformer, the fourth transformer T1D, being placed on a surface resting on posts 30 of insulating material. The transformer is thus placed on elongated post-like insulation, where the potential of the end of the insulation where the transformer is placed is in a range between the second potential and the midpoint between the second and third potential. This surface and then also the casing of the transformer TD1 is thus provided at a high potential such as the second potential V2. The seventh and the eighth converter valve elements CV7 and CV8 are placed in a common shielded box that is placed on a surface resting on insulating posts 24 in the same way as in the first embodiment. This potential may be the second potential V2. However, in this embodiment the shield of this box is not provided at the second potential V2 as in the first embodiment, but at a potential that is equal to the sum of the second and third voltages divided by two. The potential is thus (V2+V3)/2. It is thus placed at a potential that is at the mid point between the second and third potential.

In the same way also the third transformer and the fifth and sixth converter valve elements in the second set can be provided in shielded boxes at the same potential of (V2+V3)/2 or V2 as described above.

In the example given above the first potential V1 is zero and the third potential V3 is 1000 kV. However the second potential is 500 kV. This means that the converter valve element boxes will be kept at the potential 750 kV.

In order to place the transformer on the post-like insulators it is possible to provide rails 32 from a ramp, on which rails the transformer can be mobbed onto the insulators. Once in place these rails may be removed.

This embodiment also has the advantage in that insulation and bushings can be used that are dimensioned for lower voltages than the voltage of the DC power line. The insulation of each outdoor box does at most only have to be designed for withstanding the potential V3−V2. Through the two converter valve boxes having the same potential (V3+V2)/2, the insulation can be further reduced for withstanding (V3−V2)/2. This also means that the two boxes can without risk be placed closer to each other. It is furthermore possible to include all the converter valve elements of the second set in the same box.

The present invention can be varied in a multitude of ways. It should for instance be realized that other voltage and potential levels than the above described may be used.

It should also be realized that the invention can be employed on a bipole system according to the same principles. This means that there may be a third set of converter valve elements corresponding to the first set and a fourth set of converter valve elements corresponding to the second set, where the third set is provided between the first and a fourth potential and the fourth set is provided between the fourth and a fifth potential. In this case the fourth potential corresponds to the second potential and the fifth potential corresponds to the third potential. Then the absolute value of the fourth potential is higher than the absolute value of the first potential and the absolute value of the fifth potential is higher than the absolute value of the fourth potential. It should also be realized that the way the second set of converter valve elements are enclosed in shielded boxes in the second embodiment can be applied on the second set of converter valve elements in the first embodiment.

From the foregoing discussion it is evident that the present invention can be varied in a multitude of ways. It shall consequently be realized that the present invention is only to be limited by the following claims.

The invention claimed is:

1. A substation of a power transmission system having a converter for conversion between AC and DC, said converter comprising:
    a first set of series connected converter valve elements provided together in a phase leg between a first and a second potential, where the absolute value of the second potential is higher than the absolute value of the first potential, and
    a second set of converter valve elements provided in the same phase leg between the second and a third potential, where the absolute value of the third potential is higher than the absolute value of the second potential, said second set comprising at least one converter valve element,
    wherein
    the converter valve elements of the first set of converter valve elements are placed in a common enclosure in the form of a valve hall provided at the first potential,
    converter valve elements of the first set are connected to the converter valve elements of the second set via a bushing designed for withstanding voltages having potentials at the second potential,
    all converter valve elements of the second set are provided inside one or more casings placed on elongated post-like insulation, where the potential of the end of the post-like insulation on which said casings are placed is in a range between the second potential and the third potential, while the other end of said post-like insulation has ground potential, and
    the casing of at least one converter valve element in the second set is connected to the second potential.

2. The substation according to claim 1, wherein the converter valve element in the second set connected to the third potential is provided with a connection terminal provided through a bushing designed to withstand voltages having a potential that is the difference between the absolute values of the third and second potentials.

3. The substation according to claim 1, wherein the second set of converter valve elements include at least two converter valve elements, and each casing of the second set of converter valve elements has a potential that is at the mid point between the second and third potential.

4. The substation according to claim 1, further comprising a set of transformers, wherein there is at least one transformer in the set of transformers connected between converter valve elements in the second set of converter valve elements.

5. The substation according to claim 4, wherein the transformers connected to the second set of converter valve elements are each placed on elongated post-like insulation, where the potential of the end of the insulation where the transformers are placed in a range between the second potential and the midpoint between the second and third potential.

6. The substation, according to claim 5, wherein the transformers are placed at the second potential.

7. The substation according to claim 5, wherein the transformers are placed at a potential that is at the midpoint between the second and third potential.

8. The substation according to claim 2, wherein the second set of converter valve elements include at least two converter valve elements, and each casing of the second set of converter valve elements has a potential that is at the mid point between the second and third potential.

9. The substation according to claim 2, further comprising a set of transformers, wherein there is at least one transformer in the set of transformers connected between converter valve elements in the second set of converter valve elements.

10. The substation according to claim 3, further comprising a set of transformers, wherein there is at least one transformer in the set of transformers connected between converter valve elements in the second set of converter valve elements.

* * * * *